Patented May 26, 1936

2,042,414

UNITED STATES PATENT OFFICE 2,042,414

PROCESS FOR PREPARING DIMETHOXY-DIBENZANTHRONE

Raymond J. Sobatzki, Philadelphia, Pa., and John C. Kinahan, Milwaukee, Wis., assignors to E. I. du Pont de Nemours & Company, Wilmington, Del., a corporation of Delaware No Drawing. Application December 14, 1934, Serial No. 757,468. Renewed October 26, 1935

2 Claims. (Cl. 260—61)

This invention relates to the preparation of dyestuffs of the dibenzanthrone series and more particularly to the improvement in the process for the methylation of dihydroxy-dibenzanthrone.

In U. S. Patent 1,531,261, a process is described wherein an oxidized dibenzanthrone is methylated with dimethyl sulfate in nitrobenzene and in the presence of sodium carbonate. The resulting product dyes wool from an alkaline hydrosulfite vat in bright greenish-blue shades which are fast to the action of chlorine and acids.

We have found that in the methylation of dihydroxy-dibenzanthrone in nitrobenzene, using dimethyl sulfate as the methylating agent, a product can be obtained which dyes in yellower and brighter shades than the product obtained by the process outlined in U. S. Patent 1,531,261, if the methylation is carried out in the presence of small amounts of a basic nitrogen amine compound of the aliphatic or aromatic series. According to our process dihydroxy-dibenzanthrone, obtainable by the known methods and preferably in the form of press cake resulting from the oxidation of dibenzanthrone, or the press cake obtained by acid pasting the oxidized product, is suspended in nitrobenzene in the presence of sodium carbonate and a small amount of a basic nitrogen compound. Dimethyl sulfate is then slowly added and the mixture heated for several hours. The resulting compound is isolated in the usual manner and dyes cotton from a hydrosulfite vat in green shades which are yellower and brighter than can ordinarily be obtained without the use of a basic nitrogen compound.

As examples of the compounds which may be used, we may mention aniline, methyl aniline, dimethyl aniline, ethyl aniline, diphenylamine, pyridine, alpha-picoline, quinoline, diamyl-amine, triamyl-amine, triethanol-amine, etc. In general, aliphatic and aromatic amines, either primary, secondary or tertiary, including the cyclic amino compounds, when used in this process, give a dimethoxy-dibenzanthrone which dyes in yellower and brighter shades than the dimethoxy-dibenzanthrone obtained without the use of such basic compound. The amount of basic nitrogen compound which may be used will vary widely, depending to some extent upon the particular dihydroxy-dibenzanthrone used. Amounts ranging from 1 to 32%, based on the amount of dihydroxy-dibenzanthrone to be methylated have been found to produce a desirable effect.

The following examples are given to more fully illustrate our invention. The parts given are parts by weight.

Example 1

25 parts of dihydroxy-dibenzanthrone, which may be obtained according to the process described in Example 1 of U. S. Patent 1,866,501, are dissolved or suspended in 250 parts of concentrated sulfuric acid and the mass poured into 2000 parts of cold water and brought to the boil after adding 25 parts of 40% sodium bisulfite solution. The suspension is filtered and the precipitate washed acid free. This filter cake is heated with 375 parts of nitrobenzene, 1.5 parts of methyl aniline and 67 parts of 15% sodium carbonate solution until the temperature of the mass reaches approximately 150° C., under reflux conditions for the nitrobenzene, whereby the water is distilled off. The mass is cooled and 45 parts of finely powdered sodium carbonate are added and the temperature raised to about 160° C. 30 parts of dimethyl sulfate are slowly added and the mass heated at 160–165° until the reaction is complete. The mass is cooled, filtered, and the precipitate washed with nitrobenzene. The filter cake is steam distilled to free it of nitrobenzene. The resulting product consists of the dimethoxy-dibenzanthrone which dyes cotton in yellower and brighter shades than may ordinarily be obtained by methylation in the absence of the amine.

Example 2

1 part of dihydroxy-dibenzanthrone (as a press cake) and 0.2 part of sodium carbonate are suspended in 20 parts of nitrobenzene. The mixture is heated to 160°. The charge is cooled to 90–100° C. 2 parts of sodium carbonate are added and the charge is reheated to 160° C. At this point 0.05 part of pyridine is added followed by 1.2 parts of dimethyl sulfate over a two-hour period maintaining the temperature at 160° until tests show complete methylation. The dyestuff may be isolated by filtration or by steam distillation and filtration.

Example 3

10 parts of dihydroxy-dibenzanthrone are suspended in 100 parts of nitrobenzene with 1 part of sodium carbonate, and the mixture heated to from 100–160° C. until any water that may be present is driven off. The mass is cooled and 20 parts of sodium carbonate are added. The mass is then heated to approximately 160° C. and 1.0 parts of aniline are added, followed by 12.0 parts of dimethyl sulfate, which is added over a period of from 2 to 3 hours. When the reaction is completed, the dyestuff may be isolated by the procedure outlined in Example 1.

Usually the greater the amount of amine that is used, the yellower the shade of the dyestuff which is obtained. The amount of mononitrobenzene which may be used in the reaction may vary within relatively wide limits, although the use of from 10 to 20 parts, based on the dihydroxy-dibenzanthrone to be methylated, is preferred. Ortho-nitro-toluene may be used in place of nitrobenzene as a solvent for this reaction and is to be considered the full equivalent of the nitrobenzene where the use of nitrobenzene is specified in the following claims.

Various modifications may of course be made in the procedure as above outlined without departing from the scope of the invention or the spirit of the appended claims.

Under the term "amine" we intend to include those basic tertiary nitrogen compounds such as quinoline, picoline, pyridine, etc.

What we claim is:

1. In the process for preparing dimethoxy-dibenzanthrone wherein dihydroxy-dibenzanthrone is methylated in nitrobenzene with dimethyl sulfate, the step which comprises carrying out the methylation in the presence of an amine.

2. In the process for preparing dimethoxy-dibenzanthrone wherein dihydroxy-dibenzanthrone is methylated in nitrobenzene with dimethyl sulfate, the step which comprises carrying out the methylation in the presence of pyridine.

RAYMOND J. SOBATZKI.
JOHN C. KINAHAN.